United States Patent [19]

Palamand

[11] 4,389,421
[45] Jun. 21, 1983

[54] METHOD FOR CONTROLLING LIGHT STABILITY IN MALT BEVERAGES AND PRODUCT THEREOF

[75] Inventor: S. R. Palamand, St. Louis, Mo.

[73] Assignee: Busch Industrial Products Corporation

[21] Appl. No.: 316,466

[22] Filed: Oct. 30, 1981

[51] Int. Cl.³ .................................................. A23L 2/00
[52] U.S. Cl. ................................ 426/330.4; 426/592; 426/600
[58] Field of Search ........................... 426/11, 14–16, 426/330.4, 600, 268, 592; 568/336

[56] References Cited

U.S. PATENT DOCUMENTS 3,418,135  12/1968  Bayne et al. ........................... 426/16
3,418,136  12/1968  Bayne et al. ...................... 426/330.4

FOREIGN PATENT DOCUMENTS 506621  5/1976  U.S.S.R. ................................ 426/11

Primary Examiner—Raymond N. Jones
Assistant Examiner—Elizabeth A. Hatcher
Attorney, Agent, or Firm—Veo Peoples, Jr.

[57] ABSTRACT

The addition of organic compounds containing 1,8 epoxy groups such as 1,8-cineole will prevent or significantly reduce light struck flavor in malt beverages.

19 Claims, No Drawings

METHOD FOR CONTROLLING LIGHT STABILITY IN MALT BEVERAGES AND PRODUCT THEREOF

BACKGROUND OF THE INVENTION

This invention relates to beverages such as beer, ale, malt liquor, porter, shandy, and others which are made from or contain fermented extracts of malt, of improved stability against light and their manufacture.

It is well known that beer, ale, malt liquor and other malt beverages and blended beverages containing them as traditionally manufactured are not stable to light. Light of both visible and ultraviolet wave lengths affects the flavor of these products adversely, producing the so-called skunky flavor also referred to as light-struck or sunstruck flavor. It is also well known that the formation of skunky flavor is caused by chemical changes producing mercaptans, such as 3-methyl-2-butene-1-thiol (MBT). Sensory tests show that the olfactory threshold for this compound is only a few parts per billion.

Many efforts have been made in the past to overcome this problem. One of these is to shield the product from the effects of harmful radiation by packaging it in cans or dark amber bottles. Whereas, the cans afford almost complete protection against skunky flavor development, amber bottles provide protection only for several hours when exposed to direct sunlight.

Other types of glass bottles such as those made using olive green and light green glass give significantly less protection whereas in clear glass bottles the product becomes skunky almost instantly when exposed to direct sunlight. The effectiveness of glass generally in protecting the product against formation of skunky flavor depends upon the degree to which the glass is able to prevent the harmful radiation from reaching the product. The light energy needed to produce skunky flavor in beer has been found to be in the region of 1,000–10,000 Å (Angstroms) in U.S. Pat. No. 3,044,870. In terms of the degree of effectiveness of glass, dark amber bottles are the best followed by olive green and then light green bottles. Clear bottles provide little or no screening against the harmful effects.

Protection of the beverage in the package does not completely insure it against the formation of skunky flavor. Even short term exposure of the product such as occurs when in-process beer or ale is exposed to cellar lights through sight glass windows or the exposure of the product in the drinking glass to direct sunlight (such as may occur during outdoor picnics and sports events) or to diffuse light at home can and will cause the development of skunky flavor.

It is therefore desirable that the product itself be rendered safe against the action of harmful radiation instead of shielding it by packaging in specific materials. Previous efforts have been described in several patents such as U.S. Pat. Nos. 3,044,879; 3,798,332; 3,558,326 and 3,536,495. Basically the art described in these patents consists of chemically treating hops in such a way as to stabilize the light sensitive branch of the hop bitter acids by catalytic reduction thus preventing its participation in a subsequent reaction with sulfhydryl groups to produce the skunky flavored MBT compound. The process of treating hops is complex, cumbersome, time consuming and obviously expensive.

Furthermore, even beer or other beverages made with hops so treated do not possess unlimited life against the effect of radiation and such hop treatment involves a severe departure from traditional brewing which calls for the use of whole hops in developing the overall taste factors desired.

SUMMARY OF THE INVENTION

It is an object of this invention to protect beverages from the harmful effect of light without having to use hop extracts nor subject hops to other complex and time consuming operations.

It is a further object of this invention to control light struck flavor in the beverage itself to whatever degree desired.

These objects and others which will become eminently clear from the reading of this specification are fulfilled by adding to malt beverages an effective amount of an organic compound containing 1,8 epoxy groups.

DETAILED DESCRIPTION OF THE PREFERRED EMBODIMENTS

Organic compounds containing 1,8 epoxy groups, preferably 1,8-cineole when added to malt beverages can control the development of light struck flavor.

It is preferred that these compounds be used in pure form, either synthetically derived or as they naturally occur. They can be used in admixture with one another or in combination with other compounds. Among the naturally occurring sources of these effective compounds are plants such as cardamom, eucalyptus, peppermint, lavender, laurel and star anise. One embodiment of this invention involves the use of these naturally occurring plant essences themselves added to the malt beverage.

The damaging effects of the light are controlled by adding effective amounts of the compounds of the invention. Since many of these compounds themselves have an inherently associated essence of flavor or odor an effective amount is an amount sufficient to impart to the beverage the desired reduction in light sensitivity without adversely affecting the desired organoleptic properties of the final product. At the lower end of the spectrum, malt beverages having already been partially treated for light stability as for example through the use of previously described hop extracts can be further treated with compounds of this invention to augment their resistance to light struck flavor. Higher amounts can be accommmodated where it is desired to have the malt beverage incorporate high levels of the flavor attributed to the compound utilized or where the beverage is especially designed to be subjected to abnormal exposures of light or ultraviolet radiation.

In one preferred embodiment of the invention it is possible to use compounds of this invention to extend the light stability of beer commercially available in clear bottles and made from hop extracts so that its resistance to sunstruck flavor is equivalent to that of beers commercially available in dark amber bottles. For example, as little as 0.25 parts per billion of 1,8-cineole is sufficient to accomplish this.

In another preferred embodiment of this invention as little as about 1.0 part per billion to about 6.0 parts per billion of the pure epoxy compounds of this invention have been found to provide commercially acceptable protection against development of skunky flavor in a traditionally brewed malt beverage packed in a clear bottle. At these levels no significant change in the flavor of the beverage due to the addition itself has been observed for the preferred compounds of this invention, i.e., 1,8 cineole. Higher levels can be employed such as 20 ppb or higher and compounds other than the preferred compounds of this invention may be employed if the additive's own flavor contribution can be accommodated in the product. An additional embodiment of the invention permits the use of the naturally occurring flavoring essences such as cardamom, eucalyptus, peppermint, lavender, laurel, star anise, etc. but preferably cardamom directly in the malt beverage. For example, as little as 60 parts per billion of cardamom proved commercially acceptable in creating effective light stability of the product in clear glass at a level equivalent to having it in dark amber bottles. There was no significant effect on the flavor of the product. It is noted, however, that although there were 18 parts per billion of 1,8 cineole present within the 60 parts per billion of cardamom an equivalent effect can be achieved by adding only 2.0 parts per billion of the pure cineole. In the practice of this invention the protective compounds may be added to beer, ale or other similar beverages at any convenient stage of the process. However, it is preferred to add them to the finished product prior to packaging because the extremely small amounts needed to achieve the desired effect stand some risk of loss in the processing stages of brewing if added earlier.

Although the reason that 1,8 epoxy compounds are effective is not completely understood, it is believed that radiation in the wavelengths of 1,000–10,000 Angstroms in the absence of the epoxy compounds cleaves a five carbon fragment (iso-pentenyl chain) from the isohexenoyl side chain of iso-acids which then reacts with the sulfhydryl group forming the iso-pentenyl mercaptan (methyl butenyl mercaptan-MBT) which is the skunky flavor compound. The addition of 1,8 epoxy compounds to the malt beverage is believed to prevent the formation of the MBT either by reacting with the iso-pentenyl fragment or by protecting the isohexenoyl side chain from fragmenting or blocking the sulfhydryl group from reacting with the iso-pentenyl fragment. This blocking mechanism may be particularly unique with respect to creating light stability in malt beverages and much different from the prior art references to chemical reductions of hop extracts. Accordingly, other light stabilizing compounds which can perform this function, although not specifically mentioned in this disclosure, are within the contemplation of this invention.

It is noted that although pure 1,4-cineole did not appear to prevent sunstruck flavor, 1,4-cineole when used in combination with 1,8-cineole did not detract from the effectiveness of 1,8-cineole and appeared to even augment its effectiveness.

The following examples will illustrate the invention but it will be understood that they are presented for the purpose of illustration and not as indicating the limits of the invention:

EXAMPLE I

LIGHT STABILITY OF BEER PACKAGED IN CLEAR BOTTLES

| Additive | Flavor Change Due to Addition | Sunstruck Flavor Intensity after Exposure to direct Sunlight for 15 Minutes |
|---|---|---|
| Beer (control - no additive) | No change | Strong |
| Beer + 1 ppb 1,8-Cineole | No change | Moderate |
| Beer + 2 ppb 1,8-Cineole | No significant change | Trace |
| Beer + 4 ppb 1,8-Cineole | Slight odor of cineole | None |
| Beer + 6 ppb 1,8-Cineole | Odor of cineole | None |
| Beer + 60 ppb Cardamom | No change | None |
| Beer + 50 ppb Cubeb | Detectable change | None |
| Beer + 50 ppb Peppermint | Detectable change | None |
| Beer + 50 ppb Rosemary | Detectable change | None |
| Beer + 100 ppb Cubeb | Significant change | None |
| Beer + 100 ppb Peppermint | Significant change | None |
| Beer + 100 ppb Rosemary | Significant change | None |

Beer samples were evaluated after chilling them to 40 F. Total of ten experienced panelists participated in the test. Results represent average of impressions recorded by the panelists.

EXAMPLE II

Experiments conducted the same as Example I except that the additive comprised 1,8-cineole in combination with 1,4-cineole at a weight ratio of approximately 3:5, 1,8-cineole to 1,4-cineole. The results were as follows:

| Amount of Additive in the Beer | Flavor Change Due to Addition | Sunstruck Flavor Intensity after Exposure to direct Sunlight for 15 Minutes |
|---|---|---|
| 0.89 ppb | No change | None |
| 1.58 ppb | No change | None |
| 3.16 ppb | No change | None |
| 4.74 ppb | No significant change | None |
| 6.32 ppb | Slight odor of cineole | None |

EXAMPLE III

| 1 ppb 1,4-Cineole | No change | Strong |
|---|---|---|
| 2 ppb 1,4-Cineole | No change | Strong |
| 4 ppb 1,4-Cineole | Trace odor of cineole | Strong |
| 6 ppb 1,4-Cineole | Slight odor of cineole | Strong |

We conclude that pure 1,4-cineole was ineffective.

What is claimed is:

1. A malt beverage, comprising a light stabilizing material selected from the group consisting of organic compounds containing 1,8 epoxy groups and mixtures of organic compounds containing 1,8 and 1,4 epoxy groups in an amount sufficient to extend light stability, whereby the malt beverage is resistant to sunstruck flavor.

2. The product of claim 1 wherein the light stabilizing material comprises 1,8-cineole.

3. The product of claim 1 wherein the light stabilizing material comprises 1,8 and 1,4-cineole.

4. The product of claim 1 wherein the amount of material is at least 0.25 part per billion by weight.

5. The product of claim 1 wherein the amount of material is at least about 1.0 part per billion.

6. The product of claim 1 wherein the amount of material is from about 1.0 part per billion to about 6.0 parts per billion by weight.

7. The product of claim 3 wherein the ratio of 1,8-cineole to 1,4-cineole is at least 3:5 by weight.

8. A malt beverage, comprising, in an amount sufficient to extend light stability, light stabilizing natural plant essences containing materials selected from the group consisting of organic compounds containing 1,8 and 1,4 epoxy groups.

9. The product of claim 8 wherein the light stabilizing natural plant essences are selected from the group consisting of cardamom, eucalyptus, peppermint, lavender, laurel, star anise and mixtures thereof.

10. The product of claim 8 wherein the light stabilizing natural plant essence is cardamom.

11. The product of claim 8 wherein the amount of light stabilizing natural plant essence is at least about 60 parts per billion by weight of the malt beverage.

12. A method for controlling light stability in malt beverages comprising adding to the malt beverage, in amounts sufficient to extend light stability, light stabilizing materials selected from the group consisting of organic materials containing 1,8 and 1,4 epoxy groups.

13. The method of claim 12 wherein the light stabilizing material is 1,8-cineole.

14. The method of claim 13 wherein the amount of 1,8 cineole is at least about 0.25 parts per billion by weight.

15. The method of claim 13 wherein the amount of 1,8 cineloe is from about 0.25 parts billion to about 6.0 parts per billion by weight of the malt beverage.

16. The method of claim 14 wherein the light stabilizing materials are selected from the group consisting of cardamom, eucalyptus, peppermint, lavender, laurel, star anise, and mixtures thereof.

17. The method of claim 16 wherein the amount of light stabilizing material is at least 60 parts per billion by weight of the malt beverage.

18. The product of claims 8, 9 or 10 wherein the amount of light stabilizing natural plant essences is at least about 50 parts per billion.

19. The method of claim 14 where the light stabilizing material is a mixture of 1,8 and 1,4-cineole.

* * * * *